United States Patent [19]
Russell

[11] Patent Number: 5,378,157
[45] Date of Patent: Jan. 3, 1995

[54] DEVICE FOR SIMULATING ELECTRICAL CHARACTERISTICS OF COMPONENTS

[75] Inventor: Stephen R. Russell, Leicestershire, England

[73] Assignee: The Automobile Association Limited, Great Britain

[21] Appl. No.: 980,669

[22] Filed: Nov. 24, 1992

[30] Foreign Application Priority Data

Nov. 27, 1991 [GB] United Kingdom ............... 9125201
Mar. 25, 1992 [GB] United Kingdom ............... 9206719

[51] Int. Cl.$^6$ ............................................. G09B 25/00
[52] U.S. Cl. .................................. 434/379; 434/219; 434/373
[58] Field of Search .............. 434/379, 373, 372, 366, 434/365, 380, 224, 301, 370

[56] References Cited

U.S. PATENT DOCUMENTS

| | | | |
|---|---|---|---|
| 1,286,232 | 12/1918 | Coats | 434/379 X |
| 2,490,690 | 12/1949 | Koch | 434/401 |
| 3,576,936 | 2/1971 | Fischer . | |
| 3,990,157 | 11/1976 | Valentine . | |
| 4,004,353 | 1/1977 | Valentine . | |
| 4,623,312 | 11/1986 | Crawford | 434/379 X |
| 4,943,238 | 7/1990 | Gregorio | 434/366 X |
| 5,067,901 | 11/1991 | Fordham et al. . | |

FOREIGN PATENT DOCUMENTS

| | | |
|---|---|---|
| 2178875A | 2/1987 | United Kingdom . |
| 2207541A | 2/1989 | United Kingdom . |
| 2225663A | 6/1990 | United Kingdom . |
| WO90/01623 | 2/1990 | WIPO . |

*Primary Examiner*—Paul J. Hirsch
*Assistant Examiner*—Jeffrey A. Smith
*Attorney, Agent, or Firm*—Wood, Herron & Evans

[57] ABSTRACT

A device for simulating electrical characteristics of an electrical, electronic or electromechanical component comprising circuitry (21) adapted to reproduce electrical characteristics which are produced by, or may be sensed in, the component, the device (1) being configured so as to substantially resemble the component in appearance and/or size. The device may have two substantially flat opposed surfaces (3,27), one of which carries a picture (5) of the component and the other a sectional view through the component to illustrate its technical construction or operation, and/or other data relating to the component. A kit may be provided comprising a number of such devices each to simulate a component forming part of an equipment or system so as to simulate the electrical characteristics and/or performance of the equipment or system.

17 Claims, 6 Drawing Sheets

DEVICE FOR SIMULATING ELECTRICAL CHARACTERISTICS OF COMPONENTS

BACKGROUND OF THE INVENTION

This invention relates to devices for simulating the electrical characteristics of components, particularly electrical, electronic or electro-mechanical components.

It is known, when teaching students of, for example, automotive engineering, to use a component which has part of its outer surface cut away or sectioned so as to show the internal construction of the component. A device of this nature is expensive to manufacture and is not usually capable of reproducing the electrical characteristics of the component. In order to demonstrate the electrical characteristics, it is therefore necessary also to provide an operational component from which electrical measurements may be taken.

SUMMARY OF THE INVENTION

A device for simulating electrical characteristics of an electrical, electronic or electromechanical component in accordance with the invention comprises means adapted to reproduce electrical characteristics which are produced by or may be sensed in the component, the device being configured so as to substantially resemble the component in appearance and/or size.

Such a device may be used for simulating the electrical characteristics of electrical, electronic or electromechanical automobile components.

Additionally, or alternatively, the device may have two substantially flat opposed surfaces, one of which surfaces may carry a picture of the component and the other surface carry a sectional view through the component to illustrate its technical construction and/or operation.

Such a device may be used as a training aid or as a reference. For use as a reference, measurements of electrical characteristics such as, for example, resistance or capacitance may be taken from the device and compared to measurements of the same characteristics taken from a component under test, so as to determine the condition of the component under test. Should the reproducing means malfunction, the device may be repaired by removing and replacing the reproducing means, or the device may be cheaply replaced. The reproducing means may be releasably mounted within the device so that the device may simulate the characteristics of, for example, components of varying means.

The reproducing means may comprise at least one electronic circuit, each circuit having at least two electrical contact points at which the electrical characteristics are reproduced or may be sensed, the contact points being located at the outer surface of the body when the reproducing means is mounted therein.

The electronic circuit(s) may be purely passive, or a battery may be included so that the device is capable of reproducing active electrical characteristics. Means may be provided whereby the values of electrical characteristics reproduced vary, so as to simulate the effect on the component of such influences as, for example, time in use, heat, humidity, vibration, component age or condition or varying electrical or mechanical load. Such means may be manually operable or adjustable, or they may be automatic. Additionally, or alternatively, the means may be reactive to those conditions or influences experienced by the device.

The electrical contact points may be positioned with respect to the configuration of the body at locations equivalent to the locations on the operational component where the electrical characteristics are produced or may be sensed.

With such an arrangement the device is particularly suitably used as a training aid, the user learning how to measure characteristics of a component by following an equivalent measuring procedure on the device.

Other than the illustration of the component, the surface of the body may also carry data for use in interpreting measurements of electrical characteristics, taken from the component under test, in order, for example, to establish whether the component is in good, acceptable or poor condition, or whether or not the component is capable of being repaired.

Such a device may be used as a training aid or as a reference, without requiring the user to refer to a separate document so as to interpret any measurements taken.

The device may comprise upper and lower layers which are mounted to the opposed surfaces of an intermediate layer. The intermediate layer may be formed of a cheap and lightweight material, for example, perforated board or compressed card and provided with a recess to contain the reproducing means. The reproducing means may be mounted within the recess using a suitable adhesive or other mounting means. Conveniently the upper and lower layers may be formed of self-adhesive material, graphical information being applied to one surface thereof. Conveniently, any or all of the upper and lower layers and the intermediate layers may be die-stamped from sheet material.

Such a device is cheap to manufacture and assemble and the reproducing means, which may be encased in a block of resinous material, is protected from damage by the surrounding materials.

Where the device is used as a training unit, a number of devices resembling the same component may be provided, each comprising reproducing means adapted to reproduce a different value of electrical characteristics, so as to simulate a component in a range of conditions.

When it is required to train users to operate equipment or a system comprising a number of different components, a kit may be provided comprising a number of devices in accordance with the invention and leads for electrically connecting the devices, the arrangement being such that the leads to connect the devices simulate the electrical connections between the components in the operational equipment or systems.

The student may measure the electrical characteristics of each component, as simulated by separate devices, or is able to simulate the entire equipment or system and to measure electrical characteristics at different points in the electrically connected kit.

Where an equipment or system comprises a component which is complex, and/or a component having electrical connections to a number of other components, such as, for example, a central processor unit in an automobile fuel injection system, the kit may comprise two devices in accordance with the invention, each substantially resembling the component, one device comprising means adapted to reproduce the electrical characteristics which are produced by and may be sensed in the component in isolation from any other component, and the other device comprising means adapted, when the device is electrically connected to the other devices comprising the kit, to reproduce the electrical characteristics which are produced by or may be sensed in the component when the component is electrically connected to the other components comprising the equipment or system.

BRIEF DESCRIPTION OF THE DRAWINGS

The invention will now be described by way of example only with reference to the accompanying drawings in which.

DETAILED DESCRIPTION

Figure 1:
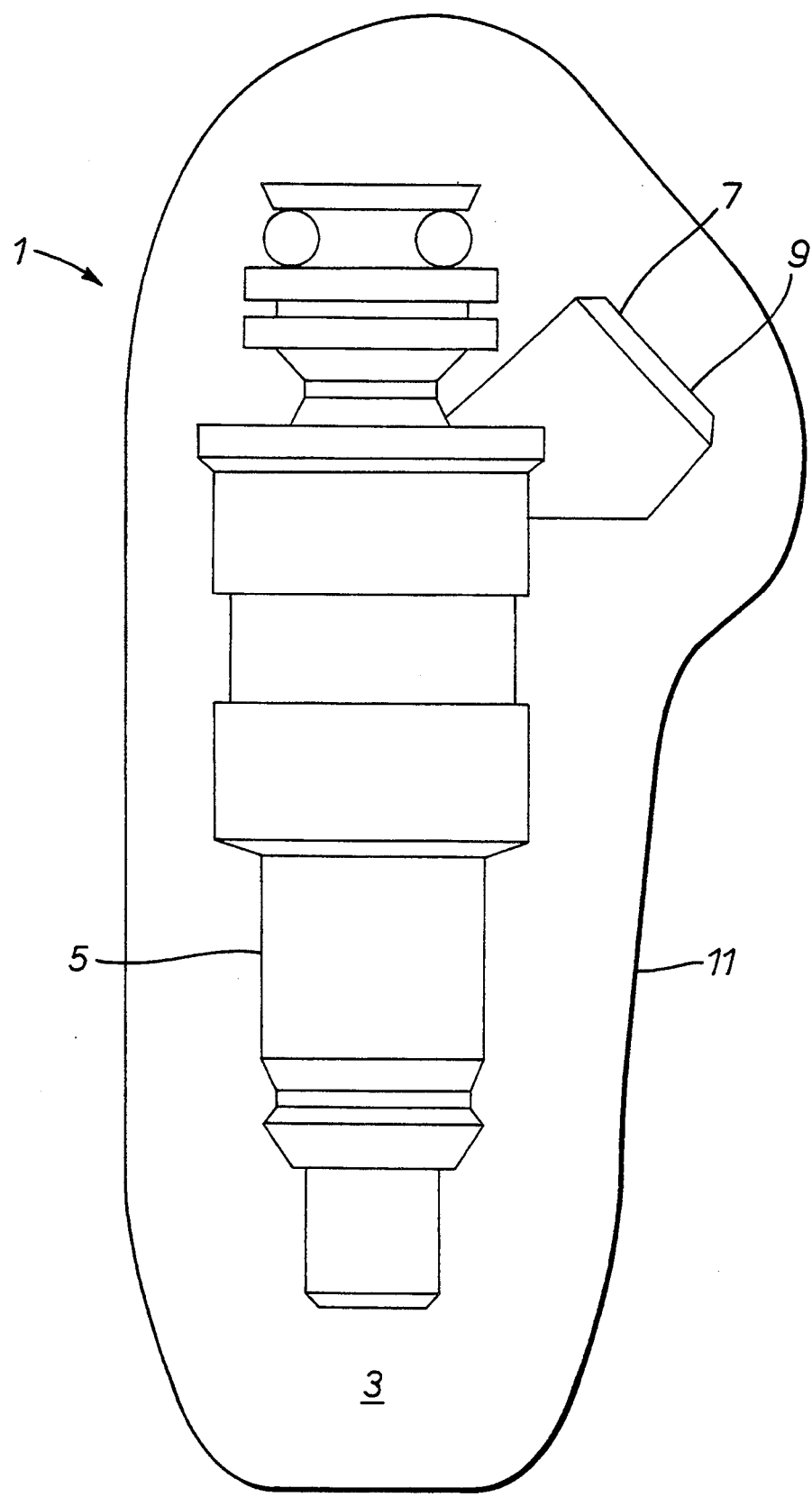
FIG. 1 is a plan view of an embodiment of a device in accordance with the invention, for simulating the electrical characteristics of a fuel injector component.

The device 1 shown in FIG. 1 has an upper layer 3 on the outer surface of which is a full scale illustration 5 of a component. The illustrated component 5 is a fuel injector, which would normally be tested by measuring electrical characteristics using a measuring device (not shown), the probes of which device are applied to the points illustrated at 7 and 9. As seen in FIG. 1, the upper layer 3 of the apparatus has an outer edge 11 which conforms approximately to the outline of illustration 5 of the fuel injector.

Figure 2:
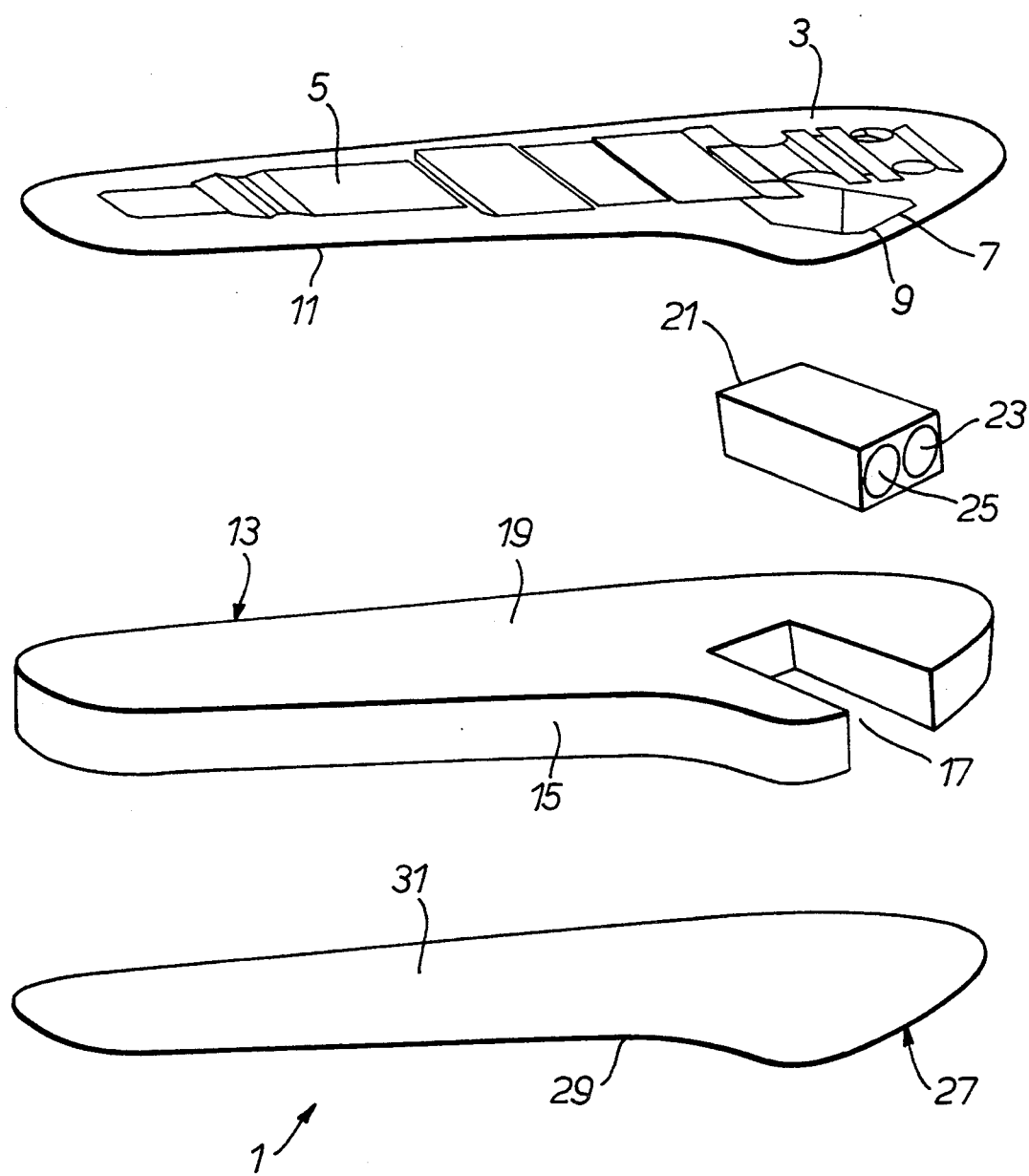
FIG. 2 is an exploded perspective view of the device of FIG. 1.

Referring now to FIG. 2, the upper layer 3 is adhered to the upper surface 19 of an intermediate layer 13 by means of a suitable adhesive. The edge 15 of the intermediate layer 13 is shaped in the same way as the edge 11 of the upper layer 3 except for recess 17, which is configured to contain an electronic circuit 21. The electronic circuit 21 is encapsulated in a suitable electrically-non conductive material, such as resin, to protect its component parts from damage. The electronic circuit 21 may be retained within recess 17 by means of a suitable adhesive or by suitable attaching means (not shown). The electronic circuit 21 has two electrical contacts 23 and 25, to be discussed further below.

The upper surface 31 of a lower layer 27 is attached to the lower surface of intermediate layer 13 by means of a suitable adhesive. The edge 29 of the lower layer 27 is stamped in the same way as edges 11 and 15 of layers 3 and 13 respectively.

The lower or outer surface (not shown) of lower layer 27 may have information printed thereon relating, for example, to the electrical characteristics of the fuel injector and/or carry a sectional view of the component to illustrate its mechanical operation. The upper and lower layers 3,27 are formed of printed self-adhesive sheet and the intermediate layer 13 is made of a low density material such as perforated board or compressed card. The layers 3,13,27 may be die-stamped from sheet material. The electronic circuit 21 is designed to simulate, at contact points 23 and 25, electrical characteristics of a functional fuel injector. The components making up the electronic circuit 21 are well known in the art, and do not form part of the invention per se. The location of the electrical contact points 23,25 on the electronic points 23,25 on the electronic circuit 21 and the position of the electronic circuit 21 with relation to the device 1, is such that electrical contact points 23,25 are positioned with respect to the illustration 5 and the edge 15 of the intermediate layer 13 at locations equivalent to those locations 7,9 on the operational fuel injector illustrated where the electrical characteristics are produced or may be sensed.

The device 1 shown, has a uniform thickness and may be readily identified by the illustration 5 and the configuration of the edges, 11,15,29 of its components. The device is suitable for use as a reference circuit or as a training aid and it may be readily stacked or displayed on a flat surface or stored in a suitable container.

Figure 3A:
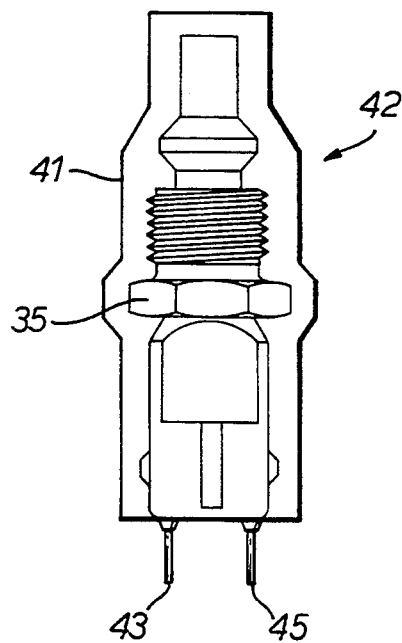
FIGS. 3A and 3B are opposite plan views of a device in accordance with the invention, for simulating the electrical characteristics of a temperature sensor.
Figure 3B:
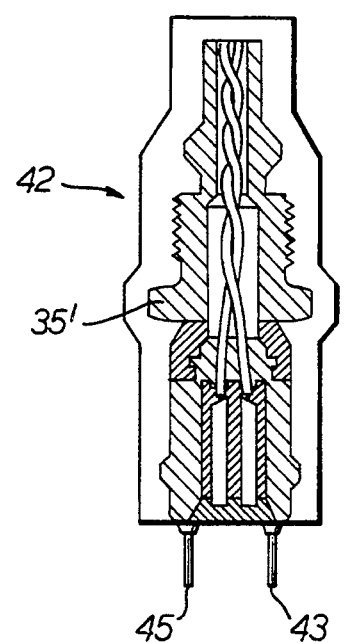

The device 42 shown in FIGS. 3A and 3B has on one face a full scale illustration 35 of a temperature sensor and on the other face a sectional view 35' of the temperature sensor. The device 42 has an outer edge 41 which conforms approximately to the outer edge of the temperature sensor illustrated. Pins 43,45 protrude from the device 42 at locations equivalent to those on the temperature sensor illustrated where the electrical characteristics are produced or may be sensed. Reproducing means (not shown) are contained within the device 42 to reproduce the electrical characteristics (e.g. resistance, capacitance, inductance) of the temperature sensors at the pins 43,45.

The device 42 is made of an intermediate layer of perforated or foam board or compressed card and the illustration 35 and the sectional view 35' are printed on self-adhesive sheet mounted to the intermediate layer. The intermediate layer and the self-adhesive sheet are die-stamped from sheet material. The reproducing means comprises an electronic circuit encased in a resin block mounted in a recess in the intermediate layer, between the self-adhesive sheets. The components making up the electronic circuit are well known in the art and do not form part of the invention.

Figure 4A:
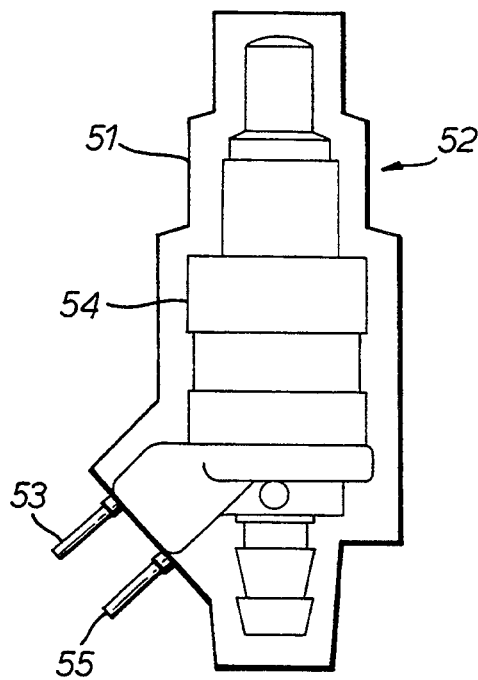
FIGS. 4A and 4B are opposite plan views of a device in accordance with the invention, for simulating the electrical characteristics of a fuel injector.
Figure 4B:
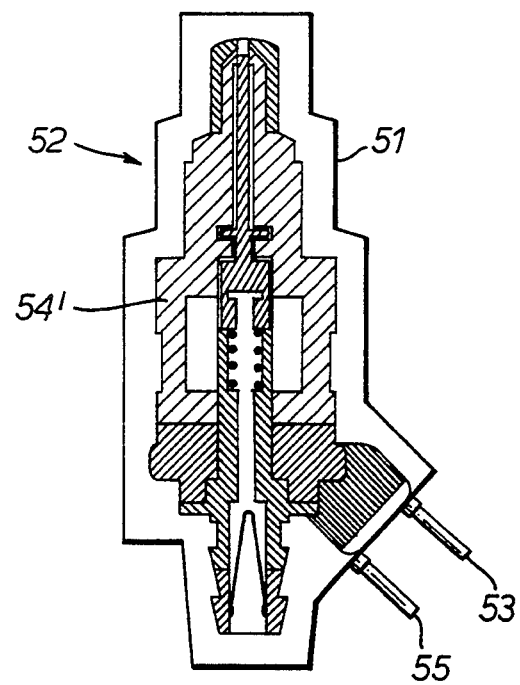

FIG. 4A shows a device 52 having an outer edge 51 which conforms to the outline of the full scale illustration 54 of a fuel injector. FIG. 4B shows the opposite face of the device 52 of a FIG. 4A, having a cross-sectional view 54' of the fuel injector. Pins 53,55 project from the outer edge 51 of the device 42 at locations equivalent to those on the fuel injector illustrated, where the electrical characteristics are produced or may be sensed. Reproducing means (not shown) are contained within the device 52 to reproduce the electrical characteristics of the fuel injector at the pins 53,55.

Figure 5A:
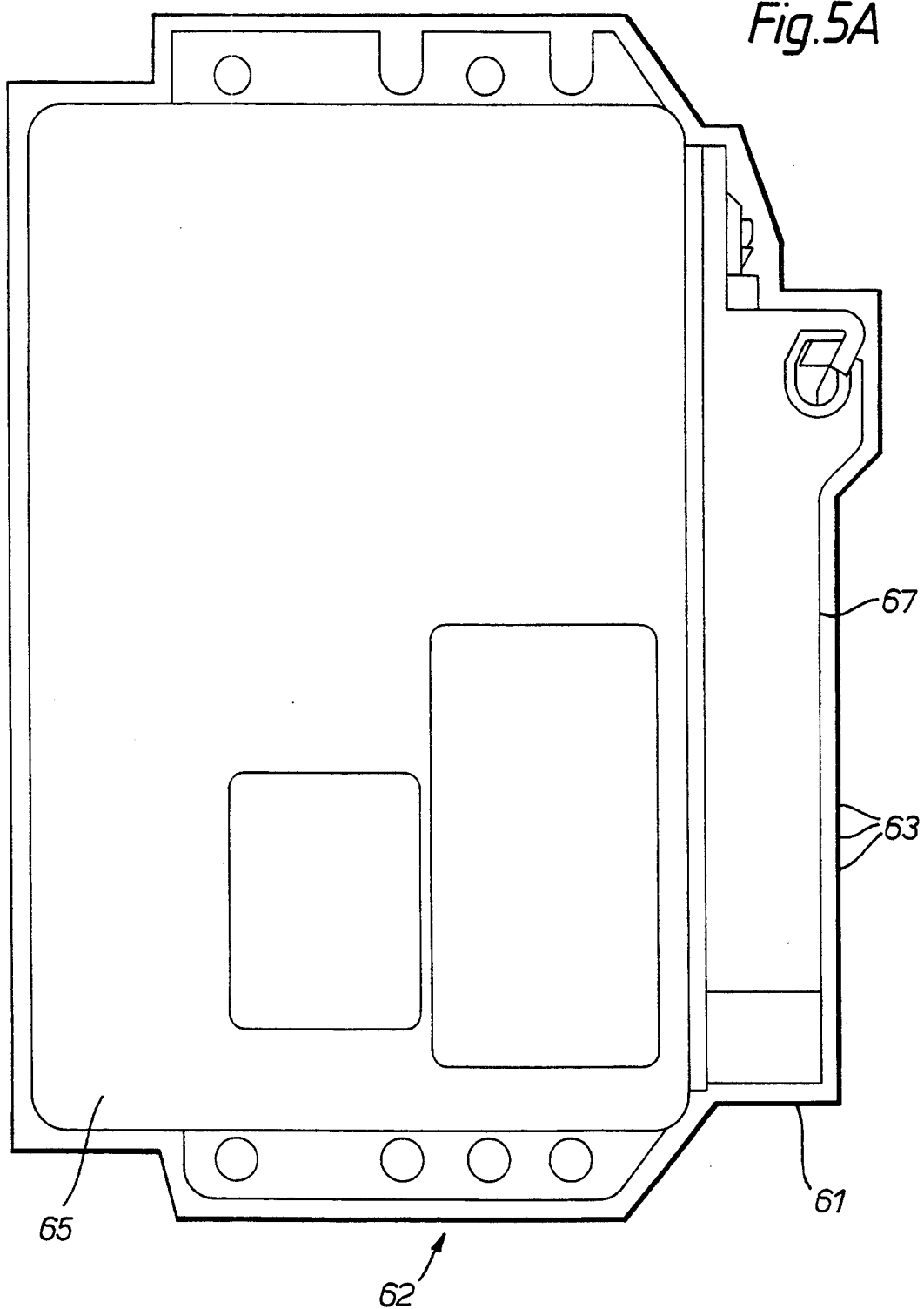
FIGS. 5A and 5B are opposite plan views of a device in accordance with the invention, for simulating the electrical characteristics of an automobile fuel injection system central processor unit.
Figure 5B:
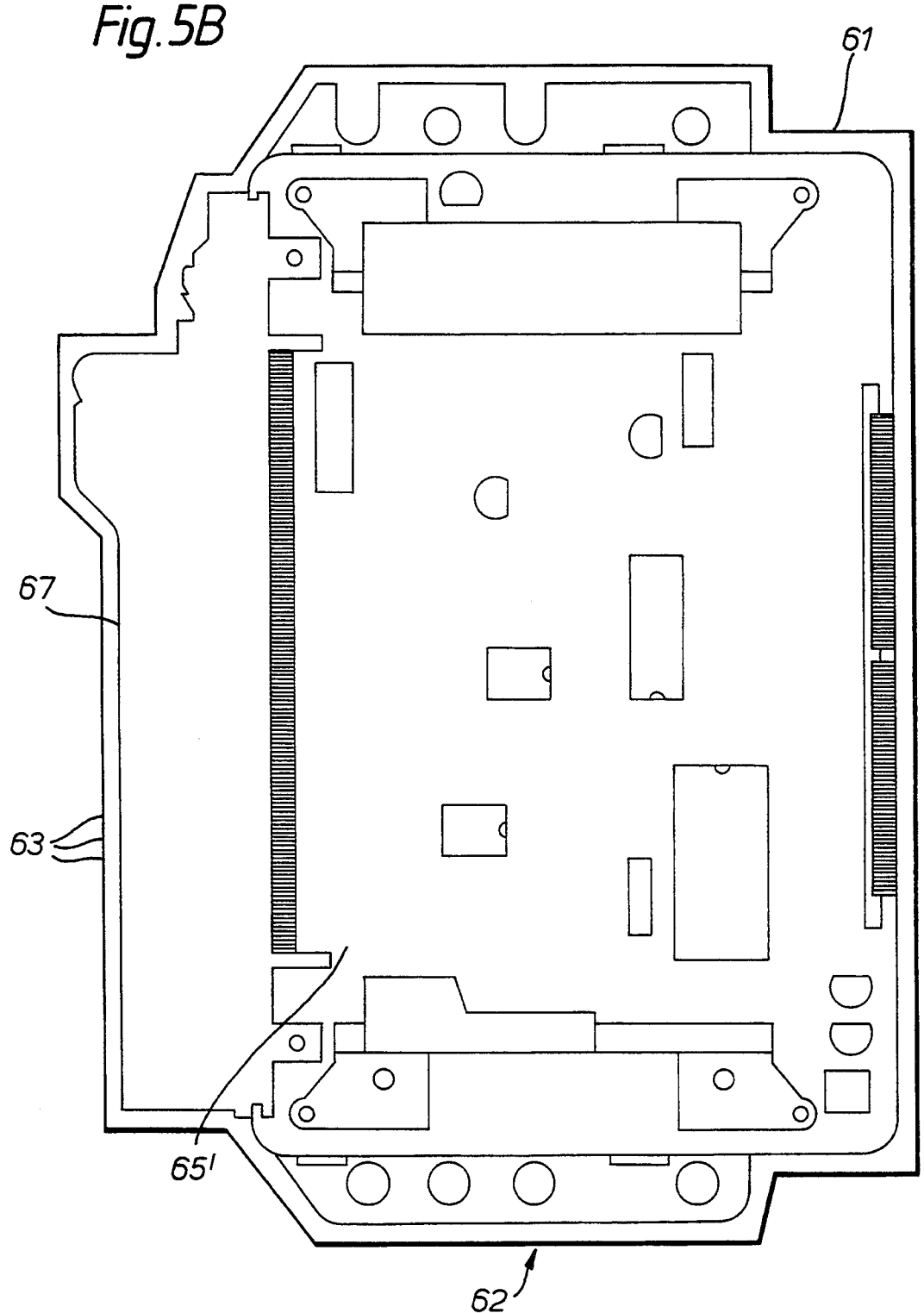

FIG. 5A is a plan view of a device 62 bearing a full scale illustration 65 of an automobile fuel injection system central processor unit (cpu), whilst FIG. 5B is a reverse plan view of the device 62 and which has an illustration 65' showing the internal construction of the cpu. The device 62 has an outer edge 61 conforming approximately to the outline of the cpu. The device 62 has a section of its outer edge 61 corresponding to the input/output port 67 of the cpu (at which port 67 the electrical connections to the other components comprising the fuel injection systems are made) located on which are contact points 63 where electrical characteristics which are produced by or may be sensed in the cpu are reproduced by means (not shown) contained within the apparatus.

Figure 6A:
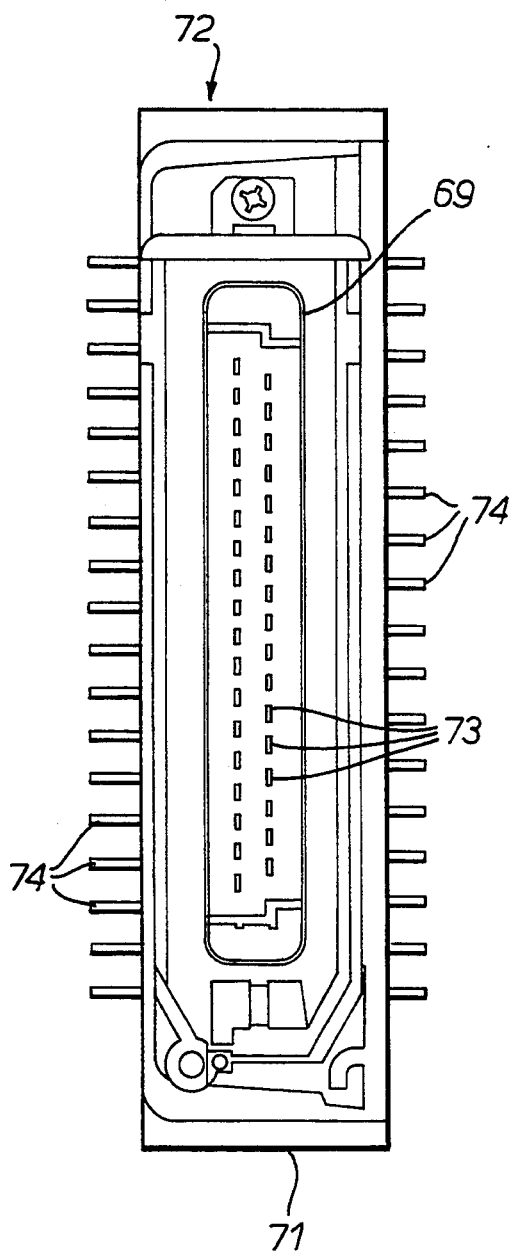
FIGS. 6A and 6B are opposite plan views of an alternative embodiment of the device of FIGS. 5A and 5B.
Figure 6B:
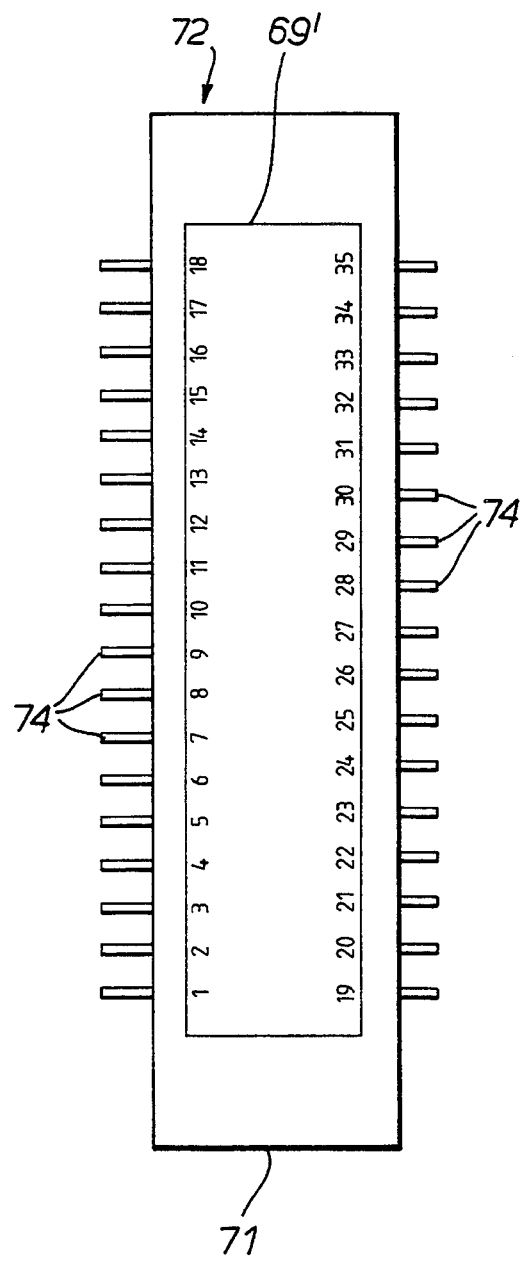

FIGS. 6A and 6B show an alternative embodiment 72 of the device 62 of FIGS. 5A and 5B. The device 72 bears on one face (shown in FIG. 6A) a full scale illustration 69 corresponding to the input/output port 67 of the cpu. The electrical contact pins 73 as they appear within the input/output port 67 of the cpu are shown on illustration 69. The device 72 has an outer edge 71 conforming approximately to the outline of the input/output port 67, and disposed about this outer edge 71 is a number of pins 73. The spacing between pins 74 enables the device 72 to be more easily used as a training aid, whether as an aid to demonstrate the electrical characteristics or the cpu (by providing suitable reproducing means (not shown) within the apparatus) or as an aid to demonstrate the electrical connection of the various components which comprise the automobile system.

FIG. 6B shows the opposite face of the device 72 and it bears a schematic diagram 69' of the device identifying the pins 74 by numbers corresponding to the usual numbering system of the pins 73 shown in the illustration 69 of the inlet/outlet port 67 of the cpu.

The reproducing means contained within device 72 could be designed to function merely as an electrical connector, or junction box, or it could be designed to reproduce all the electrical characteristics of the cpu, whether connected to the other devices comprising the simulated automobile fuel injection system or not.

I claim:

1. A device for simulating the electrical characteristics of an electric component, comprising means adapted to reproduce electrical characteristics which are produced by, or may be sensed in, the component, the device being sized and shaped so as substantially to resemble the component.

2. A device as claimed in claim 1 having two substantially flat surfaces, one of which surfaces carries a picture of the component and the other surface carries a sectional view through the component to illustrate its construction.

3. A device as claimed in claim 1 or 2 wherein the surface of the device carries data relating to the component for use in interpreting measurements of electrical characteristics of the component.

4. A device as claimed in claim 1 wherein the device comprises a body having upper and lower layers which are mounted to opposed surfaces of an intermediate layer.

5. A device as claimed in claim 4 wherein the intermediate layer is formed with a recess in which the reproducing means is mounted.

6. A device as claimed in claim 4 wherein the intermediate layer is formed of one of perforated board and compressed card.

7. A device as claimed in any one of claims 4, 5 or 6 wherein the upper and lower layers are formed of self-adhesive material, graphical information being applied to one surface of each of said upper and lower layers.

8. A device as claimed in any one of claims 4, 5, or 6 wherein the upper, lower and intermediate layers are die-stamped from sheet material.

9. A device as claimed in claims 1 or 4 wherein the reproducing means comprises an electronic circuit, the electronic circuit having at least two electrical contact points at which the electrical characteristics of the component may be sensed.

10. A device as claimed in claim 9 wherein the electrical contact points are located at an outer surface of the device.

11. A device as claimed in claim 10 wherein the electrical contact points are positioned with respect to the configuration of the device, at locations equivalent to the locations on the operational component where the electrical characteristics of that component may be sensed.

12. A device as claimed in claim 9 wherein the electronic circuit is encased in a block of electronically non-conductive material.

13. A device as claimed in claims 1, or 4 further comprising means for varying electrical characteristics reproduced by said device.

14. A device as claimed in claim 13 wherein the means for varying electrical characteristics reproduced is reactive to the conditions experienced by, or influences acting on, the device.

15. A device as claimed in claims 1, or 4 wherein the simulated component is an automobile component.

16. A kit for simulating the electrical characteristics of a system which comprises different components, the kit comprising a number of devices, each device representing a component forming part of the system, each device comprising means adapted to reproduce electrical characteristics which are produced by, or may be sensed in respective component, each device being sized and shaped so as substantially to resemble the respective component.

17. A kit as claimed in claim 16 further comprising leads for electrically connecting the devices, the leads simulating the electrical connections between the components in the system.

* * * * *